(12) United States Patent
Hwang et al.

(10) Patent No.: US 10,732,589 B2
(45) Date of Patent: Aug. 4, 2020

(54) METHOD OF CONTROLLING ENERGY STORAGE AND APPARATUSES PERFORMING THE SAME

(71) Applicant: Electronics and Telecommunications Research Institute, Daejeon (KR)

(72) Inventors: Tae in Hwang, Daejeon (KR); Il Woo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 274 days.

(21) Appl. No.: 15/799,541

(22) Filed: Oct. 31, 2017

(65) Prior Publication Data
US 2018/0239318 A1    Aug. 23, 2018

(30) Foreign Application Priority Data

Feb. 23, 2017    (KR) .................. 10-2017-0024248
Jul. 31, 2017    (KR) .................. 10-2017-0096765

(51) Int. Cl.
*G05B 15/02*    (2006.01)
*G06Q 50/06*    (2012.01)
*G06Q 10/06*    (2012.01)
*G06Q 30/06*    (2012.01)

(52) U.S. Cl.
CPC ....... *G05B 15/02* (2013.01); *G06Q 10/06312* (2013.01); *G06Q 30/0645* (2013.01); *G06Q 50/06* (2013.01)

(58) Field of Classification Search
None
See application file for complete search history.

(56) References Cited

U.S. PATENT DOCUMENTS

| | | | |
|---|---|---|---|
| 2010/0076884 A1* | 3/2010 | Lutnick | G06Q 40/04 705/37 |
| 2013/0207466 A1 | 8/2013 | Lee et al. | |
| 2013/0218356 A1 | 8/2013 | Lee et al. | |
| 2016/0344189 A1* | 11/2016 | Ozaki | H02J 3/381 |
| 2017/0070089 A1* | 3/2017 | Fukubayashi | H02J 13/0079 |

FOREIGN PATENT DOCUMENTS

| | | |
|---|---|---|
| KR | 20130068042 A | 6/2013 |
| KR | 20130074046 A | 7/2013 |
| KR | 20150067860 A | 6/2015 |

* cited by examiner

*Primary Examiner* — Kenneth M Lo
*Assistant Examiner* — Istiaque Ahmed
(74) *Attorney, Agent, or Firm* — William Park & Associates Ltd.

(57) ABSTRACT

A method of controlling an energy storage and an energy storage controlling apparatus are disclosed. The method may include dividing an energy storage of large capacity into virtual energy storages corresponding to respective users based on a required energy amount and a period of use of an energy storage of each of the users, and integrally controlling, for each time, the virtual energy storages corresponding to the respective users based on a management schedule of the energy storage of each of the users.

18 Claims, 5 Drawing Sheets

SCHEDULE 1

| | Control | Time | Output | Charge & discharge amount |
|---|---|---|---|---|
| 300-1 | Discharge | 11:00 ~ 13:00 | 10KW | 20KWh |
| 300-2 | Discharge | 13:00 ~ 15:00 | 10KW | 20KWh |
| 300-3 | Discharge | 12:00 ~ 13:00 | 20KW | 20KWh |

FIG. 4B

SCHEDULE 2

| Control | Time | Output | Charge & discharge amount |
|---|---|---|---|
| Discharge | 11:00 ~ 12:00 | 10KW | 10KWh |
| Discharge | 12:00 ~ 13:00 | 30KW | 30KWh |
| Discharge | 13:00 ~ 14:00 | 10KW | 10KWh |
| Discharge | 14:00 ~ 15:00 | 10KW | 10KWh |

FIG. 4C

SCHEDULE 3

| | Control | Time | Output | Charge & discharge amount |
|---|---|---|---|---|
| 300-4 | Discharge | 12:00 ~ 13:00 | 10KW | 10KWh |
| 300-5 | Discharge | 13:00 ~ 15:00 | 10KW | 20KWh |

FIG. 4D

SCHEDULE 4

| Control | Time | Output | Charge & discharge amount |
|---|---|---|---|
| Charge | 01:00 ~ 06:00 |  | 100KWh |
| Discharge | 11:00 ~ 12:00 | 10KW | 10KWh |
| Discharge | 12:00 ~ 13:00 | 40KW | 40KWh |
| Discharge | 13:00 ~ 14:00 | 20KW | 20KWh |
| Discharge | 14:00 ~ 15:00 | 20KW | 20KWh |

METHOD OF CONTROLLING ENERGY STORAGE AND APPARATUSES PERFORMING THE SAME

CROSS-REFERENCE TO RELATED APPLICATION(S)

This application claims the priority benefit of Korean Patent Application No. 10-2017-0024248 filed on Feb. 23, 2017, and Korean Patent Application No. 10-2017-0096765, filed on Jul. 31, 2017, in the Korean Intellectual Property Office, the disclosures of which are incorporated herein by reference for all purposes.

BACKGROUND

1. Field

One or more example embodiments relate to a method of controlling an energy storage and apparatuses performing the same.

2. Description of Related Art

Homes, buildings, and factories may provide distributed resources of, for example, an energy storing apparatus, solar power, and wind power, within a building and/or a consumer site to reduce a maximum demand for power and to enable participation in a demand resource trading market. A consumer may use distributed resources in case of a power supply emergency and/or to consume energy more efficiently.

The initial investment required to install the distributed resources may be large and it is difficult to manage and maintain the distributed resources after they have been installed. Also, if the distributed resources are needed only during a predetermined period and a predetermined season due to a characteristic of a consumer, the expensive distributed resources may not be used continuously and effectively.

SUMMARY

An aspect provides a technology for renting and integrally controlling virtual energy storages corresponding to respective users to allow a user who has not built an energy storage yet to reduce initial investment costs for installing the energy storage, to provide an energy storage that is used more effectively, to reduce a cost of managing the energy storage, to reduce an effort required to manage the energy storage, to reduce a maximum power requirement due to an energy storage rent, and to enable participation in a demand resource trading market.

Another aspect also provides a technology that allows a businessman who builds an energy storage to obtain initial investment costs for installing the energy storage and minimize a risk to business promotion.

According to an aspect, there is provided a method of controlling an energy storage including dividing an energy storage of large capacity into virtual energy storages corresponding to respective users based on a required energy amount and a period of use of an energy storage of each of the users, and integrally controlling, for each time, the virtual energy storages corresponding to the respective users based on a management schedule of the energy storage of each of the users.

The dividing may include dividing the energy storage of large capacity to a plurality of virtual logical energy storages, the energy storage of large capacity being physical, and generating a virtual invariable energy storage by invariably allocating an energy storage area associated with the required energy amount and the period of use desired by a long-term renter among the virtual logical energy storages.

The method may further include registering a management schedule of an energy storage of the long-term renter.

The dividing further may include generating a virtual variable energy storage by variably allocating an energy storage area associated with the required energy amount and the period of use desired by a short-term renter to remaining energy storage areas excluding the invariably allocated energy storage area among the virtual logical energy storages.

The method may further include registering a management schedule of an energy storage of the short-term renter.

The integrally controlling may include calculating an integral management schedule of the virtual energy storages based on a management schedule of the energy storage of the long-term renter and a management schedule of an energy storage of the short-term renter, and integrally controlling the virtual energy storages for each time based on the integral management schedule.

The calculating of the integral management schedule may include calculating a time-based first management schedule of a virtual invariable energy storage corresponding to the long-term renter based on the management schedule of the energy storage of the long-term renter, calculating a time-based second management schedule of a virtual variable energy storage corresponding to the short-term renter based on the management schedule of the energy storage of the short-term renter, and calculating the integral management schedule for each time based on the first management schedule and the second management schedule.

The integrally controlling may include integrally controlling, for each time, the virtual energy storages by any one of a charge and a discharge based on the integral management schedule.

The calculating of the integral management schedule may include calculating the management schedule based on a discharge loss rate of a physical energy storage linked to the virtual energy storages.

According to another aspect, there is provided an energy storage controlling apparatus including an interface configured to receive a management schedule, a required energy amount, and a period of use of an energy storage of each of users, and a processor configured to divide an energy storage of large capacity into virtual energy storages of the respective users based on the required energy amount and the period of use of the energy storage of each of the users, and integrally control, for each time, the virtual energy storages corresponding to the respective users based on a management schedule of the energy storage of each of the users.

The processor may be configured to divide the energy storage of large capacity into a plurality of virtual logical energy storages, the energy storage of large capacity is physical, and generate a virtual invariable energy storage by invariably allocating an energy storage area associated with the required energy amount and the period of use desired by a long-term renter among the virtual logical energy storages.

The processor may be configured to register a management schedule of an energy storage of the long-term renter.

The processor may be configured to generate a virtual variable energy storage by variably allocating an energy storage area associated with the required energy amount and the period of use desired by a short-term renter to remaining energy storage areas excluding the invariably allocated energy storage area among the virtual logical energy storages.

The processor may be configured to register a management schedule of an energy storage of the short-term renter.

The processor may be configured to calculate an integral management schedule of the virtual energy storages based on the management schedule of the energy storage of the long-term renter and a management schedule of an energy storage of the short-term renter, and integrally control the virtual energy storages for each time based on the integral management schedule.

The processor may be configured to calculate a time-based first management schedule of a virtual invariable energy storage corresponding to the long-term renter based on the management schedule of the energy storage of the long-term renter, calculate a time-based second management schedule of a virtual variable energy storage corresponding to the short-term renter based on the management schedule of the energy storage of the short-term renter, and calculate the integral management schedule for each time based on the first management schedule and the second management schedule.

The processor may be configured to integrally control, for each time, the virtual energy storages by any one of a charge and a discharge based on the integral management schedule.

The processor may be configured to calculate the management schedule based on a discharge loss rate of a physical energy storage linked to the virtual energy storages.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 4B illustrates a first management schedule according to an example embodiment;

FIG. 4C illustrates a management schedule of an energy storage of a short-term renter according to an example embodiment; and FIG. 4D illustrates an integrated management schedule according to an example embodiment.

DETAILED DESCRIPTION

Figure 1:
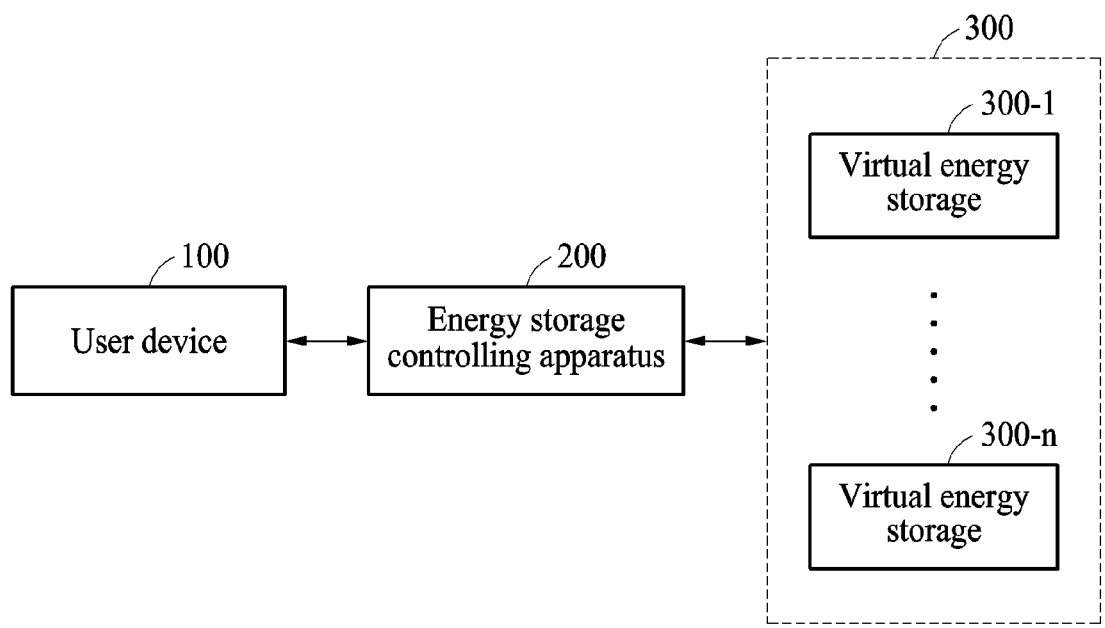
FIG. 1 is a block diagram illustrating an energy storage controlling system according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions may not be described in detail because they would obscure the description with unnecessary detail.

The terminology used herein is for the purpose of describing the example embodiments only and is not intended to be limiting of the disclosure. As used herein, the singular forms "a," "an," and "the" are intended to include the plural forms as well, unless the context clearly indicates otherwise. It will be further understood that the terms "include/comprise" and/or "have," when used in this disclosure, specify the presence of stated features, integers, steps, operations, elements, components, or combinations thereof, but do not preclude the presence or addition of one or more other features, integers, steps, operations, elements, components, and/or groups thereof. In addition, the terms such as "unit," "-er (-or)," and "module" described in the specification refer to an element for performing at least one function or operation, and may be implemented in hardware, software, or the combination of hardware and software.

Terms such as first, second, A, B, (a), (b), and the like may be used herein to describe components. Each of these terminologies is not used to define an essence, order or sequence of a corresponding component but used to distinguish the corresponding component from other component(s). For example, a first component may be referred to a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments are described in detail with reference to the accompanying drawings. Like reference numerals in the drawings denote like elements, and a known function or configuration will be omitted herein.

FIG. 1 is a block diagram illustrating an energy storage controlling system according to an example embodiment.

Referring to FIG. 1, an energy storage controlling system 10 includes a user device 100, an energy storage controlling apparatus 200, and an energy storage 300 of large capacity.

The user device 100 may communicate with the energy storage controlling apparatus 200. For example, the user device 100 may communicate with the energy storage controlling apparatus 200 via an Internet communication network, an Intranet, a local area network (LAN), a wireless LAN, a Wi-Fi, a low frequency (LF), Xbee, Zigbee, Bluetooth, and Beacon.

The user device 100 may be used by each user. For example, each user may be a consumer that requires an energy storage (or energy) of small capacity. Here, the energy storage (or energy) of small capacity may be required by various structures such as homes, buildings, and factories. A consumer may require an energy storage (or energy) during at least one of a predetermined period or a predetermined season.

The user device 100 may be implemented as an electronic device. For example, an electronic device is implemented as a personal computer (PC), a data server, or a portable electronic device.

The portable electronic device may be implemented as a laptop computer, a mobile phone, a smartphone, a tablet PC, a mobile internet device (MID), a personal digital assistant (PDA), an enterprise digital assistant (EDA), a digital still camera, a digital video camera, a portable multimedia player (PMP), a personal navigation device or a portable navigation device (PND), a handheld game console, an e-book, and a smart device. The smart device may be implemented as a smartwatch or a smartband.

The user device 100 may transmit a user response signal to the energy storage apparatus 200 based on a response of each user. For example, the user response signal includes at least one of a management schedule, a required energy amount (or required energy storage space), or a period of use (or rental period) of an energy storage of each user.

The user device 100 may display control information on the energy storage 300 of large capacity transmitted from the energy storage controlling apparatus 200. For example, the control information includes at least one of information on virtual energy storages corresponding to respective users, time-based management schedules of the virtual energy storages corresponding to the respective users, a time-based integrated management schedule, or real-time management information.

The user device 100 may be an interface connecting each of the users and the energy storage controlling apparatus 200.

The energy storage controlling apparatus 200 may control the energy storage 300 of large capacity based on the user response signal transmitted from the user device 100 of each of the users. The energy storage 300 of large capacity includes a plurality of virtual energy storages 300-1 through 300-n. The energy storage 300 of large capacity may be implemented as a single physical energy storage or a plurality of physical energy storages.

For example, the energy storage controlling apparatus 200 may rent virtual energy storages corresponding to the respective users among the virtual energy storages 300-1 through 300-n based on the required energy amount (or required energy storage space) and the period of use (or rental period) of the energy storage of each of the users. The energy storage controlling apparatus 200 may integrally control, for each time, a charge and a discharge of the virtual energy storages corresponding to the respective users based on the management schedule of the energy storage of each of the users.

The energy storage controlling apparatus 200 may rent and integrally control the virtual energy storages corresponding to the respective users to allow a user who has not built an energy storage yet to reduce initial investment costs for installing the energy storage, to provide an energy storage that is used more effectively, to reduce a cost of managing the energy storage, to reduce an effort required to manage the energy storage, to reduce a maximum power requirement due to an energy storage rent, and to enable participation in a demand resource trading market.

The energy storage controlling apparatus 200 may allow a businessman who builds an energy storage to obtain initial investment costs for installing the energy storage and minimize a risk to business promotion.

Figure 2:
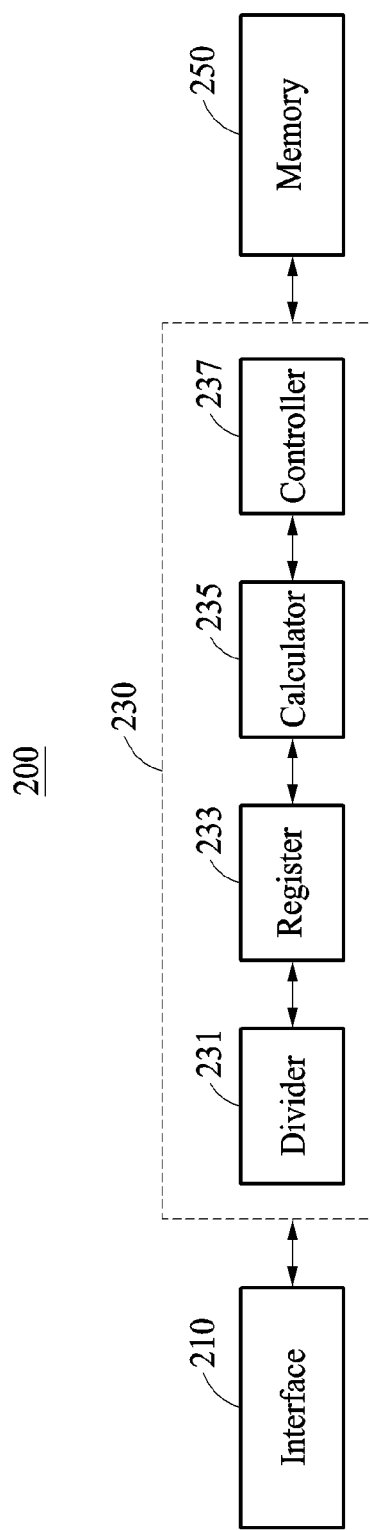
FIG. 2 is a block diagram illustrating an energy storage controlling apparatus of FIG. 1 according to an example embodiment.

FIG. 2 is a block diagram illustrating an energy storage controlling apparatus of FIG. 1 according to an example embodiment.

Referring to FIG. 2, the energy storage controlling apparatus 200 includes an interface 210, a processor 230, and a memory 250.

The interface 210 receives a user response signal transmitted from the user device 100 of each user. The interface 210 transmits control information on the energy storage 300 of large capacity to the user device 100.

The processor 230 controls an overall operation of the energy storage controlling apparatus 200. For example, the processor 230 controls operations of the interface 210 and the memory 250.

The processor 230 divides the energy storage 300 of large capacity into virtual energy storages corresponding to respective users based on a required energy amount (or required energy storage space) and a period of use (or rental period) of an energy storage of each of the users.

For example, the period of use (or rental period) of the energy storage of each of the users indicates a period for a short-term rental or a long-term rental of energy storage required by each user. The required energy amount (or required energy storage space) of the energy storage of each of the users indicates a predetermined capacity (or predetermined storage space) of the energy storage 300 of large capacity to be rented by each of the users. The predetermined capacity (or predetermined storage space) of the energy storage 300 of large capacity may correspond to any one of the virtual energy storages 300-1 through 300-n.

The processor 230 integrally controls the virtual energy storages corresponding to the respective users for each time based on a management schedule of the energy storage of each of the users.

For example, the management schedule is a management schedule of the energy storage to be rented by each of the users and includes a control method, a control time, an output amount, an amount of charge and discharge. The management schedule of the energy storage of each of the users may further include the required energy amount (or required energy storage space) and the period of use (or rental period) of the energy storage of each of the users.

The processor 230 includes a divider 231, a register 233, a calculator 235, and a controller 237.

The divider 231 divides the energy storage 300 of large capacity into the virtual energy storages 300-1 through 300-n.

The divider 231 divides the energy storage 300 of large capacity into a plurality of virtual logical energy storages. Here, the energy storage 300 of large capacity is physical. For example, a virtual logical energy storage may be any one of a plurality of energy storages obtained by equally dividing the physical energy storage 300 of large capacity by a predetermined capacity (or predetermined space).

The divider 231 may allocate energy storage areas corresponding to the respective users to the virtual logical energy storages based on the required energy amount (or required energy storage space) and the period of use (or rental period) of the energy storage of each of the users.

When a user is a long-term renter, the divider 231 may invariably allocate an energy storage area associated with the required energy amount (or required energy storage space) and the period of use (or rental period) desired by the long-term renter among the virtual logical energy storages.

When the user is a short-term renter, the divider 231 may variably allocate an energy storage area associated with the required energy amount (or required energy storage space) and the period of use (or rental period) desired by the short-term renter to remaining energy storage areas excluding the invariably allocated energy storage area among the virtual logical energy storages.

The divider 231 generates the virtual energy storages corresponding to the respective users based on the invariably allocated energy storage area or the variably allocated energy storage area.

When the user is the long-term renter, the divider 231 may generate a virtual invariable energy storage based on the invariably allocated energy storage area. For example, the virtual invariable energy storage is any one of the virtual energy storages 300-1 through 300-n.

When the user is the short-term renter, the divider 231 may generate a virtual variable energy storage based on the variably allocated energy storage area. For example, the virtual variable energy storage is one of the remaining virtual energy storages excluding the virtual invariable energy storage among the virtual energy storages 300-1 through 300-n.

The register 233 registers the management schedule of the energy storage of each of the users.

When the user is the long-term renter, the register 233 may register a management schedule of an energy storage of the long-term renter.

When the user is the short-term renter, the register 233 may register a management schedule of an energy storage of the short-term renter.

The calculator 235 calculates an integrated management schedule of the virtual energy storages corresponding to the respective users based on the management schedule of the energy storage of each of the users.

The calculator 235 may calculate a time-based first management schedule of the virtual invariable energy storage corresponding to the long-term renter based on the management schedule of the energy storage of the long-term renter.

Subsequently, the calculator 235 may calculate a time-based second management schedule of the virtual variable energy storage corresponding to the short-term renter based on the management schedule of the energy storage of the short-term renter.

The calculator 235 may calculate the integrated management schedule for each time based on the first management schedule and the second management schedule.

The calculator 235 may calculate the management schedule based on a discharge loss rate of a physical energy storage linked to the virtual energy storages. In response to a discharge of the virtual energy storages, the calculator 235 may calculate the management schedule based on the discharge loss rate of the physical energy storage linked to the virtual energy storages such that the virtual energy storages discharge 90% of total generation capacity.

The controller 237 integrally controls the virtual energy storages corresponding to the respective users for each time based on the integrated management schedule. For example, the controller 237 may integrally control, for each time, the virtual energy storages corresponding to the respective users by at least one of a charge or a discharge based on the integrated management schedule.

The controller 237 transmits information on the energy storage 300 of large capacity to the user device 100 via the interface 210. For example, control information on the energy storage 300 of large capacity includes information associated with the energy storages corresponding to the respective users. The information associated with the energy storages corresponding to the respective users may be at least one of information on the virtual energy storages corresponding to the respective users, the time-based management schedule of each of the virtual energy storages corresponding to the respective users, the time-based integral management schedule, and real-time management information.

The memory 250 may be provided outside the processor 230, but a position of the memory 250 is not limited thereto. For example, the memory 250 may be included in the processor 230.

The memory 250 stores information on the energy storage 300 of large capacity and the user response signal.

Figures 3, 4A:
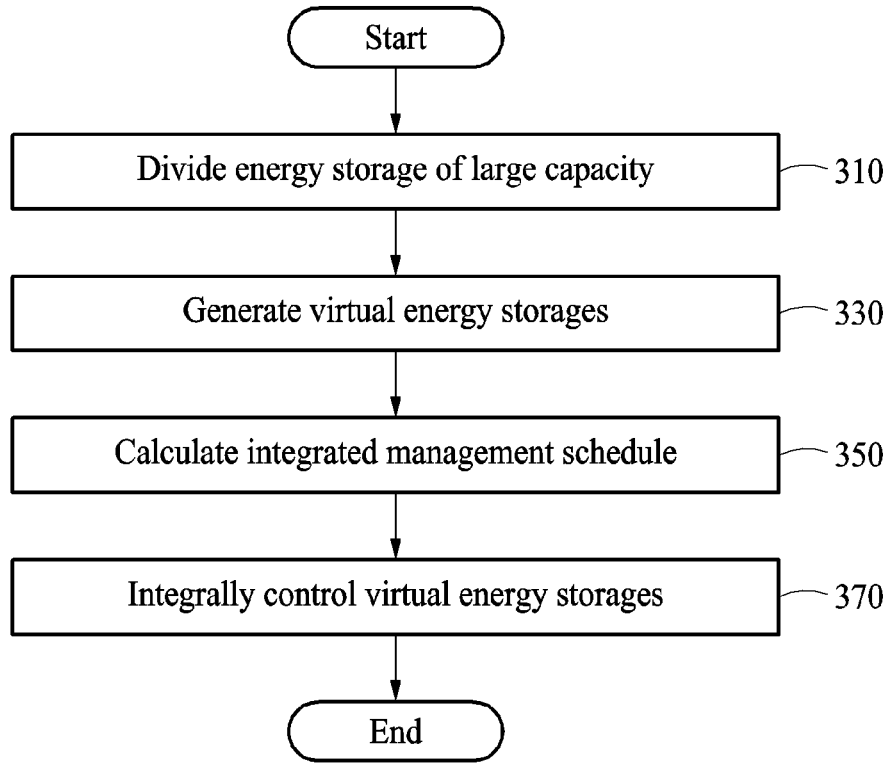
FIG. 3 is a flowchart illustrating an operation of an energy storage controlling apparatus of FIG. 1 according to an example embodiment.
FIG. 4A illustrates a management schedule of an energy storage of a long-term renter according to an example embodiment.

FIG. 3 is a flowchart illustrating an operation of an energy storage controlling apparatus of FIG. 1 according to an example embodiment, FIG. 4A illustrates a management schedule of an energy storage of a long-term renter according to an example embodiment, FIG. 4B illustrates a first management schedule according to an example embodiment, FIG. 4C illustrates a management schedule of an energy storage of a short-term renter according to an example embodiment, and FIG. 4D illustrates an integrated management schedule according to an example embodiment.

For ease of description, it is assumed that a maximum storage capacity of the energy storage 300 of FIG. 4 is 100 kilowatt-hour (KWh), and a maximum output is 50 kilowatts (KWs).

Referring to FIGS. 3 through 4D, the divider 231 divides the physical energy storage 300 of large capacity into a plurality of logical energy storages divided by a predetermined capacity (or predetermined space) in operation 310.

In operation 330, the divider 231 generates virtual energy storages corresponding to respective users by invariably or variably allocating energy storage areas associated with a required energy amount (or required energy storage space) and a period of use (or rental period) desired by each of the users among the virtual logical energy storages.

For example, each of the virtual energy storages 300-1 through 300-3 of FIG. 4A is a virtual invariable energy storage corresponding to a long-term renter. In addition, each of the virtual energy storages 300-4 and 300-5 may be a virtual variable energy storage corresponding to a short-term renter.

In operation 350, the calculator 235 calculates an integrated management schedule of the virtual energy storages corresponding to the respective users based on management schedules of the energy storages of the users.

The calculator 235 may calculate a time-based first management schedule, for example, SCHEDULE 2, of a virtual invariable energy storage of FIG. 4B based on a management schedule, for example, SCHEDULE 1, of an energy storage of a long-term renter of FIG. 4A registered by the register 233.

In more detail, a control method of the first energy storage 300-1 among the virtual invariable energy storages 300-1 through 300-3 corresponds to a discharge, a control time of the first energy storage 300-1 corresponds to 11:00~13:00, an output of the first energy storage 300-1 corresponds to 10 KW, and a charge and discharge amount of the first energy storage 300-1 corresponds to 20 KWh. A control method of the third energy storage 300-3 corresponds to a discharge, a control time of the third energy storage 300-3 corresponds to 12:00~13:00, an output of the third energy storage 300-3 corresponds to 20 KW, and a charge and discharge amount of the third energy storage 300-3 corresponds to 20 KWh.

When a control time corresponds to 11:00~12:00, a control method of the time-based first management schedule, for example, SCHEDULE 2, corresponds to a discharge, an output corresponds to 10 KW, and a charge and discharge amount corresponds to 10 KWh.

When a control time corresponds to 12:00~13:00, the control method of the time-based first management schedule, for example, SCHEDULE 2, corresponds to a discharge, the output corresponds to 30 KW, and the charge and discharge amount corresponds to 30 KWh.

When a control time corresponds to 13:00~14:00, the control method of the time-based first management schedule, for example, SCHEDULE 2, corresponds to a discharge, the output corresponds to 10 KW, and the charge and discharge amount corresponds to 10 KWh.

When a control time corresponds to 14:00~15:00, the control method of the time-based first management schedule, for example, SCHEDULE 2, corresponds to a discharge, the output corresponds to 10 KW, and the charge and discharge amount corresponds to 10 KWh.

Subsequently, the calculator 235 may calculate an integrated management schedule, for example, SCHEDULE 4, of the virtual energy storages corresponding to the respective users based on the first management schedule, for example, SCHEDULE 2, and a management schedule, for example, SCHEDULE 3, of an energy storage of a short-term renter of FIG. 4C registered by the register 233.

In more detail, a control method of the first energy storage 300-4 among the virtual invariable energy storages 300-4 and 300-5 corresponds to a discharge, a control time of the first energy storage 300-4 corresponds to 12:00~13:00, an output of the first energy storage 300-4 corresponds to 10 KW, and a charge and discharge amount of the first energy storage 300-4 corresponds to 10 KWh. A control method of the second energy storage 300-5 corresponds to a discharge, a control time of the second energy storage 300-5 corresponds to 13:00~15:00, an output of the second energy storage 300-5 corresponds to 10 KW, and a charge and discharge amount of the second energy storage 300-5 corresponds to 20 KWh.

When a control time corresponds to 01:00~06:00, a control method of the time-based integrated management schedule, for example, SCHEDULE 4, corresponds to a charge, an output corresponds to 0 KW, and a charge and discharge amount corresponds to 100 KWh.

When the control time corresponds to 11:00~12:00, the control method of SCHEDULE 4 corresponds to a discharge, the output corresponds to 10 KW, and the charge and discharge amount corresponds to 10 KWh.

When the control time corresponds to 12:00~13:00, the control method of SCHEDULE 4 corresponds to the discharge, the output corresponds to 40 KW, and the charge and discharge amount corresponds to 40 KWh.

When the control time corresponds to 13:00~14:00, the control method of SCHEDULE 4 corresponds to the discharge, the output corresponds to 20 KW, and the charge and discharge amount corresponds to 20 KWh.

When the control time corresponds to 14:00~15:00, the control method of SCHEDULE 4 corresponds to the discharge, the output corresponds to 20 KW, and the charge and discharge amount corresponds to 20 KWh.

In operation 370, the controller 237 integrally controls, for each time, the virtual energy storages corresponding to the respective users based on the integrated management schedule.

For example, the controller 237 integrally controls, for each time, the virtual energy storages 300-1 through 300-5 obtained by dividing the energy storage 300 of large capacity based on the time-based integrated management schedule, SCHEDULE 4, of FIG. 4C.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of controlling an energy storage, the method comprising:
    dividing an energy storage of large capacity into virtual energy storages corresponding to respective users based on a required energy amount and a period of use of the energy storage of each of the users, wherein at least one of the users is a short-term renter of the energy storage and at least one of the users is a long-term renter of the energy storage; and
    integrally controlling, for each time, the virtual energy storages corresponding to the respective users based on a management schedule of the energy storage of each of the users,
    wherein the management schedule includes a control method, a control time, an output amount, an amount of charge and discharge, required energy storage space and a rental period of the energy storage of each of the users.

2. The method of claim 1, wherein the dividing comprises:
    dividing the energy storage of large capacity to a plurality of virtual logical energy storages, the energy storage of large capacity being physical; and
    generating a virtual invariable energy storage by invariably allocating an energy storage area associated with the required energy amount and the period of use desired by the long-term renter among the virtual logical energy storages.

3. The method of claim 2, further comprising: registering a management schedule of an energy storage of the long-term renter.

4. The method of claim 2, wherein the dividing further comprises generating a virtual variable energy storage by variably allocating an energy storage area associated with the required energy amount and the period of use desired by the short-term renter to remaining energy storage areas excluding the invariably allocated energy storage area among the virtual logical energy storages.

5. The method of claim 4, further comprising: registering a management schedule of an energy storage of the short-term renter.

6. The method of claim 4, wherein the integrally controlling comprises:
    calculating an integral management schedule of the virtual energy storages based on a management schedule of the energy storage of the long-term renter and a management schedule of an energy storage of the short-term renter; and
    integrally controlling the virtual energy storages for each time based on the integral management schedule.

7. The method of claim 6, wherein the calculating of the integral management schedule comprises:
    calculating a time-based first management schedule of a virtual invariable energy storage corresponding to the long-term renter based on the management schedule of the energy storage of the long-term renter;
    calculating a time-based second management schedule of a virtual variable energy storage corresponding to the short-term renter based on the management schedule of the energy storage of the short-term renter; and
    calculating the integral management schedule for each time based on the first management schedule and the second management schedule.

8. The method of claim 6, wherein the integrally controlling comprises integrally controlling, for each time, the virtual energy storages by any one of a charge and a discharge based on the integral management schedule.

9. The method of claim 6, wherein the calculating of the integral management schedule comprises calculating the management schedule based on a discharge loss rate of a physical energy storage linked to the virtual energy storages.

10. An energy storage controlling apparatus, comprising:
    an interface configured to receive a management schedule, a required energy amount, and a period of use of an energy storage of each of users; and
    a processor configured to divide an energy storage of large capacity into virtual energy storages corresponding to the respective users based on the required energy amount and the period of use of the energy storage of each of the users, and integrally control, for each time, the virtual energy storages corresponding to the respective users based on a management schedule of the energy storage of each of the users,
    wherein at least one of the users is a short-term renter of the energy storage and at least one of the users is a long-term renter of the energy storage; and
    wherein the management schedule includes a control method, a control time, an output amount, an amount of charge and discharge, required energy storage space and a rental period of the energy storage of each of the users.

11. The energy storage controlling apparatus of claim 10, wherein the processor is configured to divide the energy storage of large capacity into a plurality of virtual logical energy storages, the energy storage of large capacity is physical, and generate a virtual invariable energy storage by invariably allocating an energy storage area associated with the required energy amount and the period of use desired by the long-term renter among the virtual logical energy storages.

12. The energy storage controlling apparatus of claim 11, wherein the processor is configured to register a management schedule of an energy storage of the long-term renter.

13. The energy storage controlling apparatus of claim 11, wherein the processor is configured to generate a virtual variable energy storage by variably allocating an energy storage area associated with the required energy amount and the period of use desired by the short-term renter to remaining energy storage areas excluding the invariably allocated energy storage area among the virtual logical energy storages.

14. The energy storage controlling apparatus of claim 13, wherein the processor is configured to register a management schedule of an energy storage of the short-term renter.

15. The energy storage controlling apparatus of claim 13, wherein the processor is configured to calculate an integral management schedule of the virtual energy storages based on the management schedule of the energy storage of the long-term renter and a management schedule of an energy storage of the short-term renter, and integrally control the virtual energy storages for each time based on the integral management schedule.

16. The energy storage controlling apparatus of claim 15, wherein the processor is configured to calculate a time-based first management schedule of a virtual invariable energy storage corresponding to the long-term renter based on the management schedule of the energy storage of the long-term renter, calculate a time-based second management schedule of a virtual variable energy storage corresponding to the short-term renter based on the management schedule of the energy storage of the short-term renter, and calculate the integral management schedule for each time based on the first management schedule and the second management schedule.

17. The energy storage controlling apparatus of claim 15, wherein the processor is configured to integrally control, for each time, the virtual energy storages by any one of a charge and a discharge based on the integral management schedule.

18. The energy storage controlling apparatus of claim 15, wherein the processor is configured to calculate the management schedule based on a discharge loss rate of a physical energy storage linked to the virtual energy storages.

* * * * *